United States Patent
Wu (10) Patent No.: US 12,101,793 B2
(45) Date of Patent: Sep. 24, 2024

(54) UPLINK TRANSMISSION METHOD, ELECTRONIC DEVICE, AND STORAGE MEDIUM

(71) Applicant: GUANGDONG OPPO MOBILE TELECOMMUNICATIONS CORP., LTD., Dongguan (CN)

(72) Inventor: Zuomin Wu, Dongguan (CN)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 349 days.

(21) Appl. No.: 17/563,803

(22) Filed: Dec. 28, 2021

(65) Prior Publication Data
US 2022/0124699 A1    Apr. 21, 2022

Related U.S. Application Data (63) Continuation of application No. PCT/CN2019/116866, filed on Nov. 8, 2019.

(51) Int. Cl.
| | | |
|---|---|---|
| H04W 72/51 | (2023.01) | |
| H04L 1/1812 | (2023.01) | |
| H04L 5/00 | (2006.01) | |
| H04L 27/26 | (2006.01) | |
| H04W 72/0446 | (2023.01) | |
| H04W 72/23 | (2023.01) | |

(52) U.S. Cl.
CPC ............ *H04W 72/51* (2023.01); *H04L 1/1812* (2013.01); *H04L 5/0053* (2013.01); *H04L 27/2607* (2013.01); *H04W 72/0446* (2013.01); *H04W 72/23* (2023.01)

(58) Field of Classification Search
None
See application file for complete search history.

(56) References Cited

U.S. PATENT DOCUMENTS

| | | | |
|---|---|---|---|
| 11,792,856 B2 * | 10/2023 | Hosseini | H04W 72/1268 370/336 |
| 2019/0289622 A1 * | 9/2019 | Chatterjee | H04W 72/20 |

(Continued)

FOREIGN PATENT DOCUMENTS

| | | |
|---|---|---|
| CN | 110035544 A | 7/2019 |
| CN | 110149726 A | 8/2019 |

(Continued)

OTHER PUBLICATIONS

Communication pursuant to Article 94(3) EPC for European Application 19951807.7 mailed Sep. 29, 2023.
Japanese Office Action with English Translation for JP Application 2021-578080 mailed Oct. 3, 2023.
(Continued)

*Primary Examiner* — Kodzovi Acolatse
(74) *Attorney, Agent, or Firm* — Sheppard, Mullin, Richter & Hampton LLP (57) ABSTRACT

The present disclosure provides an uplink transmission method, an electronic device, and a storage medium. The method includes: determining, by a terminal device, a start position of an uplink channel; and determining, by the terminal device, a transmission of the uplink channel based on whether a processing delay is satisfied. Whether the processing delay is satisfied is dependent on the start position of the uplink channel and/or a processing capability of the terminal device.

10 Claims, 5 Drawing Sheets

(56) References Cited

U.S. PATENT DOCUMENTS

| | | | | |
|---|---|---|---|---|
| 2021/0314100 A1* | 10/2021 | Yeo | ............... | H04B 7/0417 |
| 2021/0400467 A1* | 12/2021 | Li | ............... | H04W 24/02 |
| 2022/0061076 A1* | 2/2022 | Ma | ............... | H04L 1/0003 |
| 2022/0061101 A1* | 2/2022 | Wu | ............... | H04L 5/0053 |
| 2022/0225333 A1* | 7/2022 | Liu | ............... | H04W 72/23 |
| 2022/0255682 A1* | 8/2022 | Gao | ............... | H04L 1/1861 |

FOREIGN PATENT DOCUMENTS

| | | |
|---|---|---|
| CN | 110417521 A | 11/2019 |
| KR | 20200050596 A | 5/2020 |
| WO | 2019160387 A1 | 8/2019 |
| WO | 2021080337 A1 | 4/2021 |

OTHER PUBLICATIONS

Ad-hoc Chair (Ericsson), "Chairman's notes of AI 7.2.2 NR-based Access to Unlicensed Spectrum",3GPP TSG RAN WG1 #98b R1-1911511 (Oct. 22, 2019).

Ericsson, "Even Further Analysis of UE Initial Transmit Timing Requirement", 3GPP TSG RAN WG4 #85, R4-1713648 (Nov. 17, 2017).

Huawei, HiSilicon, "Coexistence and channel access for NR unlicensed band operations", 3GPP TSG RAN WG1 #98 R1-1908109 (Aug. 17, 2019).

LG Electronics, "Channel access procedure for NR-U",3GPP TSG RAN WG1 #98b R1-1910819 (Oct. 8, 2019).

Qualcomm, Nokia, "Draft text proposal to 38.214 subclause 5.3 on UE processing time", 3GPP TSG RAN WG1 #92 R1-180xxxx (Mar. 5, 2018).

Oppo, "Channel access procedures for NR-U",3GPP TSG RAN WG1 #99 R1-1912506 (Nov. 9, 2019).

Extended European Search Report dated Jun. 27, 2022 received in European Patent Application No. EP19951807.7.

The Second Office Action from corresponding Chinese Application No. 202210125263.X, dated May 20, 2023. English translation attached.

Grant Notice & Supplementary Search from corresponding Chinese Application No. 202210125263.X, dated Jun. 21, 2023 . English translation attached.

First Examination Report dated Oct. 27, 2022 received in India Patent Application No. IN202127061182.

First Office Action from corresponding Chinese Application No. 202210125263.X, dated Mar. 1, 2023 . English translation attached.

Communication pursuant to Article 94(3) EPC for European application 19951807.7 mailed Mar. 15, 2023.

International Search Report and Written Opinion dated Jul. 29, 2020 in International Application No. PCT/CN2019/116866. English translation is attached.

3GPP. "NR; Physical Layer Procedures for Data", 3GPP TS 38.214 V15.7.0, Sep. 28, 2019, full text, p. 103.

* cited by examiner

| A network device determines whether an uplink channel received by the network device includes valid data based on a start position of the uplink channel transmitted by a terminal device and/or a processing capability of the terminal device. | S301 |

UPLINK TRANSMISSION METHOD, ELECTRONIC DEVICE, AND STORAGE MEDIUM

CROSS-REFERENCE TO RELATED APPLICATIONS

The present application is a continuation of International Application No. PCT/CN2019/116866 filed on Nov. 8, 2019, which is hereby incorporated by reference in its entirety.

TECHNICAL FIELD

The present disclosure relates to wireless communication technology, and more particularly, to an uplink transmission method, an electronic device, and a storage medium.

BACKGROUND

In New Radio (NR)-based access to unlicensed spectrum (NR-U), when a terminal device (or User Equipment (UE)) is scheduled for uplink transmission, a start position of the uplink transmission indicated by a network device may occur before a valid uplink transmission resource. In this case, it is not clear how the terminal device is to perform the uplink transmission.

SUMMARY

In order to solve the above technical problem, the embodiments of the present disclosure provide an uplink transmission method, an electronic device, and a storage medium, capable of enabling a terminal device to perform an uplink transmission when a start position of the uplink transmission indicated by a network device occurs before a valid uplink transmission resource.

In the first aspect, an embodiment of the present disclosure provides an uplink transmission method. The method includes: determining, by a terminal device, a start position of an uplink channel; and determining, by the terminal device, a transmission of the uplink channel based on whether a processing delay is satisfied. Whether the processing delay is satisfied is dependent on the start position of the uplink channel and/or a processing capability of the terminal device.

In a second aspect, an embodiment of the present disclosure provides an uplink transmission method. The method includes: determining, by a network device, whether an uplink channel received by the network device includes valid data based on a start position of the uplink channel transmitted by a terminal device and/or a processing capability of the terminal device.

In a third aspect, an embodiment of the present disclosure provides a terminal device. The terminal device includes: a first processing unit configured to determine a start position of an uplink channel; and a second processing unit configured to determine a transmission of the uplink channel based on whether a processing delay is satisfied. Whether the processing delay is satisfied is dependent on the start position of the uplink channel and/or a processing capability of the terminal device.

In a fourth aspect, an embodiment of the present disclosure provides a network device. The network device includes: a third processing unit configured to determine whether an uplink channel received by the network device includes valid data based on a start position of the uplink channel transmitted by a terminal device and/or a processing capability of the terminal device.

In a fifth aspect, an embodiment of the present disclosure provides a terminal device. The terminal device includes a processor and a memory for storing a computer program executable on the processor. The processor is configured to, when executing the computer program, perform the steps of the above uplink transmission method performed by the terminal device.

In a sixth aspect, an embodiment of the present disclosure provides a network device. The network device includes a processor and a memory for storing a computer program executable on the processor. The processor is configured to, when executing the computer program, perform the steps of the above uplink transmission method performed by the network device.

In a seventh aspect, an embodiment of the present disclosure provides a chip. The chip includes a processor configured to invoke and execute a computer program from a memory, to enable a device provided with the chip to perform the above uplink transmission method performed by the terminal device.

In an eighth aspect, an embodiment of the present disclosure provides a chip. The chip includes a processor configured to invoke and execute a computer program from a memory, to enable a device provided with the chip to perform the above uplink transmission method performed by the network device.

In a ninth aspect, an embodiment of the present disclosure provides a storage medium. The storage medium stores an executable program which, when executed by a processor, implements the above uplink transmission method performed by the terminal device.

In a tenth aspect, an embodiment of the present disclosure provides a storage medium. The storage medium stores an executable program which, when executed by a processor, implements the above uplink transmission method performed by the network device.

In an eleventh aspect, an embodiment of the present disclosure provides a computer program product. The computer program product includes computer program instructions that cause a computer to perform the above uplink transmission method performed by the terminal device.

In a twelfth aspect, an embodiment of the present disclosure provides a computer program product. The computer program product includes computer program instructions that cause a computer to perform the above uplink transmission method performed by the network device.

In a thirteenth aspect, an embodiment of the present disclosure provides a computer program. The computer program causes a computer to perform the above uplink transmission method performed by the terminal device.

In a fourteenth aspect, an embodiment of the present disclosure provides a computer program. The computer program causes a computer to perform the above uplink transmission method performed by the network device.

In the uplink transmission method, electronic device, and storage medium according to the embodiments of the present disclosure, a terminal device determines a start position of an uplink channel, and determines a transmission of the uplink channel based on whether a processing delay is satisfied. Here, whether the processing delay is satisfied is dependent on the start position of the uplink channel and/or a processing capability of the terminal device. In this way, the terminal device can determine whether the processing delay is satisfied based on the start position of the uplink channel and/or the processing capability of the terminal device, and determine the transmission of the uplink channel based on whether the processing delay is satisfied. A network device can also determine whether the uplink channel received by the network device includes valid data based on the start position of the uplink channel and/or the processing capability of the terminal device. In this way, the terminal device is enabled to perform the uplink transmission when the start position of the uplink transmission indicated by the network device occurs before a valid uplink transmission resource of the terminal device.

DESCRIPTION OF EMBODIMENTS

In order to facilitate a more thorough understanding of the features and technical content of the embodiments of the present disclosure, the implementation of the embodiments of the present disclosure will be described in detail below with reference to the figures. The figures are for reference only and are not intended to limit the embodiments of the present disclosure.

Before describing the uplink transmission methods according to the embodiments of the present disclosure in detail, a brief description of the unlicensed spectrum and the uplink transmission in the non-NR-UX system will be given first.

The unlicensed spectrum is a spectrum that is planned by countries and regions for communications of radio devices. This spectrum is usually considered to be a shared spectrum. That is, communication devices in different communication systems can use this spectrum as long as they meet the regulatory requirements set by the countries or regions on the spectrum, without having to apply for any proprietary spectrum licenses from the governments.

In order to allow various communication systems that use the unlicensed spectrum for wireless communication to coexist friendly on this spectrum, some countries or regions have stipulated the legal requirements that must be met when using the unlicensed spectrum. For example, electronic devices (or communication devices) follow a Listen Before Talk (LBT) principle. That is, an electronic device needs to perform channel listening, or Clear Channel Assessment (CCA), before transmitting a signal on a channel on the unlicensed spectrum. Only when the channel listening result indicates that the channel is idle, the electronic device can transmit the signal. If the channel listening result of the electronic device on the channel on the unlicensed spectrum indicates that the channel is busy, then the electronic device cannot transmit any signal. In order to ensure fairness, in one transmission, the time length during which the electronic device can use the channel on the unlicensed spectrum for signal transmission cannot exceed Maximum Channel Occupancy Time (MCOT).

1. Transmission of Physical Uplink Shared Channel (PUSCH) in Rel-15 NR System

In the NR system, a PUSCH transmission is determined based on an N2 value. If a terminal device receives uplink grant information from a network device, the uplink grant information schedules the terminal device to transmit a target PUSCH carrying a target transport block and a Demodulation Reference Signal (DMRS). If the terminal device determines, based on the uplink grant information, e.g., based on a Start and Length Indication Value (SLIV) in the uplink grant information, that a start position of the first uplink symbol of the target PUSCH, with the influence of timing advance taken into account, is not earlier than Symbol L2, then the terminal device can transmit the target transport block; or otherwise the UE ignores the Downlink Control Information (DCI) corresponding to the scheduling.

Here, Symbol L2 is defined as the next uplink symbol after the end position of the last symbol of the Physical Downlink Control Channel (PDCCH) carrying the uplink grant information. The start position of the Cyclic Prefix (CP) of the next uplink symbol is later than $T_{proc,2}=\max((N_2+d_{2,1})(2048+144)\cdot\kappa 2^{-\mu}\cdot T_C, d_{2,2})$, where $d_{2,1}=0$ if the first symbol in the PUSCH is used to transmit the DMRS only, or otherwise $d_{2,1}=1$, $T_C=1/(\Delta f_{max}\cdot N_f)$, $\Delta f_{max}=480\cdot 10^3$ Hz, $N_f=4096$, and $\mu$ is used to determine a subcarrier spacing (SCS).

Here, Processing Capability 2 is a processing capability different from Processing Capability 1. It can be understood that the $N_2$ values corresponding to Processing Capability 1 of the terminal device are different from the $N_2$ values corresponding to Processing Capability 2 of the terminal device. Table 1 below shows the $N_2$ values corresponding to Processing Capability 1 of the terminal device, and Table 2 below shows the $N_2$ values corresponding to Processing Capability 2 of the terminal device.

TABLE 1

| μ | PUSCH preparation time $N_2$ (symbols) |
|---|---|
| 0 | 10 |
| 1 | 12 |
| 2 | 23 |
| 3 | 36 |

TABLE 2

| μ | PUSCH preparation time $N_2$ (symbols) |
|---|---|
| 0 | 5 |
| 1 | 5.5 |
| 2 | 11 for frequency range 1 |

2. Transmission of Physical Uplink Shared Channel (PUCCH) in Rel-15 NR System

In the NR system, a PUCCH transmission is determined based on an N1 value or PDSCH processing time of a terminal device.

The terminal device receives downlink grant information from a network device. The downlink grant information schedules the terminal device to receive a PDSCH carrying a target transport block. If the terminal device determines, based on timing information K1 of allocated Hybrid Automatic Repeat reQuest-ACK (HARQ-ACK) information and PUCCH resource indication information, that HARQ-ACK information corresponding to the scheduled PDSCH is transmitted via a target PUCCH, and the start position of the first uplink symbol of the target PUCCH, with the influence of timing advance taken into account, is not earlier than Symbol L1, then the terminal device can transmit the valid HARQ-ACK information for the scheduled PDSCH to the network device; or otherwise the terminal device cannot transmit the valid HARQ-ACK information for the scheduled PDSCH to the network device.

Here, Symbol L1 is defined as the next uplink symbol after the end position of the last symbol of the PDSCH carrying the target transport block. The start position of the Cyclic Prefix (CP) of the next uplink symbol is later than $T_{proc,1}=(N_1+d_{1,1})(2048+144)\cdot\kappa 2^{-\mu}\cdot T_C$.

Here, the value of $d_{1,1}$ is dependent on the mapping type of PDSCH.

Here, Processing Capability 2 is a processing capability different from Processing Capability 1. It can be understood that the N1 values corresponding to Processing Capability 1 of the terminal device are different from the N1 values corresponding to Processing Capability 2 of the terminal device. Table 3 below shows the N1 values corresponding to Processing Capability 1 of the terminal device, and Table 4 below shows the N1 values corresponding to Processing Capability 2 of the terminal device. μ corresponds to the subcarrier spacing from ($\mu_{PDCCH}$, $\mu_{PDSCH}$, $\mu_{UL}$) that can maximize the value of $T_{proc,1}$, where $\mu_{PDCCH}$ corresponds to the subcarrier spacing of the PDCCH scheduling the PDSCH, $\mu_{PDSCH}$ corresponds to the subcarrier spacing of the scheduled PDSCH, and $\mu_{UL}$ corresponds to the subcarrier spacing of the uplink channel for the HARQ-ACK to be transmitted.

TABLE 4

| μ | PDSCH decoding time N1 [symbols] dmrs-AdditionalPosition = pos0 in DMRS-DownlinkConfig in both of dmrs-DownlinkForPDSCH-MappingTypeA, dmrs-DownlinkForPDSCH-MappingTypeB |
|---|---|
| 0 | 3 |
| 1 | 4.5 |
| 2 | 9 for frequency range 1 |

3. Channel State Information (CSI) Calculation Time in Rel-15 NR System

When a CSI request field in DCI triggers reporting of CSI on a PUSCH, a terminal device provides a valid CSI report for the n-th triggered CSI report. If the start position of the first uplink symbol of the target PUSCH carrying the CSI, with the influence of timing advance taken into account, is not earlier than Symbol $Z_{ref}$, and the start position of the first uplink symbol of the target PUSCH carrying the n-th CSI report, with the influence of timing advance taken into account, is not earlier than Symbol $Z'_{ref}(n)$.

Here, Symbol $Z_{ref}$ is defined as the next uplink symbol after the end position of the last symbol of the PDCCH that carries information triggering the reporting of CSI. The start position of the CP of the next uplink symbol is later than $T_{proc,CSI}=(Z)(2048+144)\cdot\kappa 2^{-\mu}\cdot T_C$.

Symbol $Z'_{ref}(n)$ is defined as, when aperiodic Channel State Information-Reference Signal (CSI-RS) is used for channel measurement that triggers the n-th CSI report, the next uplink symbol after the end position of the last symbol of an aperiodic CSI-RS resource for channel measurement, an aperiodic CSI Interference Measurement (CSI-IM) resource for interference measurement, or an aperiodic Non-Zero Power (NZP) CSI-RS resource for interference measurement, whichever occurs last. The start position of the CP of the next uplink symbol is later than $T_{proc,CSI}=(Z')(2048+144)\cdot\kappa 2^{-\mu}\cdot T_C$.

CSI Calculation Processing Capability 1 and CSI Calculation Processing Capability 2 of the terminal device correspond to different processing capabilities of the terminal device, respectively.

4. Uplink Transmission in NR-U System

Figure 1:
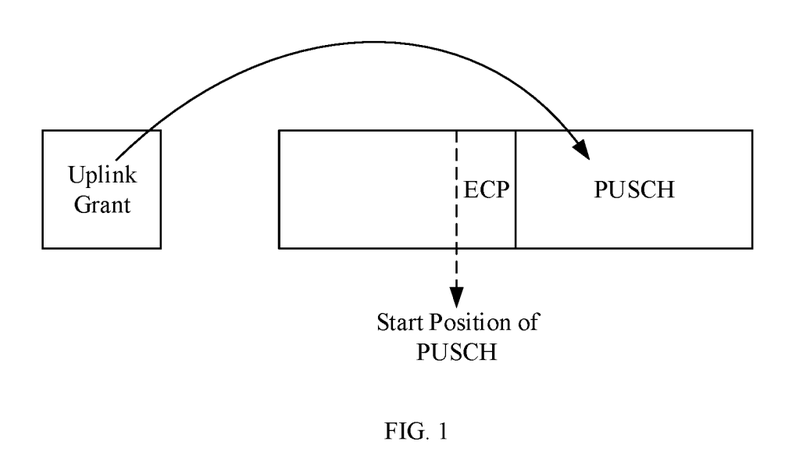
FIG. 1 is a schematic diagram showing a situation where a start position of an uplink channel occurs before a valid uplink channel transmission resource.

In the NR-U system, when a terminal device is scheduled for transmission of an uplink channel (such as PUSCH), the start position of the uplink channel may be located before a valid uplink channel transmission resource (such as PUSCH resource). As shown in FIG. 1, the start position of the PUSCH is at the start position of the Extended Cyclic Prefix (ECP). In particular, the length of the ECP indicated to the terminal device is determined based on at least one of the following situations:

TABLE 3

| μ | PDSCH decoding time N1 [symbols] | |
|---|---|---|
| | dmrs-AdditionalPosition = pos0 in DMRS-DownlinkConfig in both of dmrs-DownlinkForPDSCH-MappingTypeA, dmrs-DownlinkForPDSCH-MappingTypeB | dmrs-AdditionalPosition ≠ pos0 in DMRS-DownlinkConfig in either of dmrs-DownlinkForPDSCH-MappingTypeA, dmrs-DownlinkForPDSCH-MappingTypeB or if the higher layer parameter is not configured |
| 0 | 8 | $N_{1,0}$ |
| 1 | 10 | 13 |
| 2 | 17 | 20 |
| 3 | 20 | 24 |

1) 0 (i.e., no CP extension)
2) C1*symbol length−25 us
3) C2*symbol length−16 us−Timing Advance (TA)
4) C3*symbol length−25 us−TA Here, the values of C1, C2, and C3 can be different for different subcarrier spacings. For example, C1=1 for the SCS of 15 kHz and 30 kHz, and C1=2 for the SCS of 60 kHz.

When the start position of the scheduled PUSCH for the terminal device occurs before the valid PUSCH resource, it is not clear how the terminal device is to perform uplink transmission, e.g., whether to perform uplink transmission and what data the uplink transmission is to carry.

The technical solutions of the embodiments of the present disclosure can be applied to various communication systems, including for example: Global System of Mobile communication (GSM) system, Code Division Multiple Access (CDMA) system, Wideband Code Division Multiple Access (WCDMA) system, General Packet Radio Service (GPRS), Long Term Evolution (LTE) system, LTE Frequency Division Duplex (FDD) system, LTE Time Division Duplex (TDD) system, Advanced Long Term Evolution (LTE-A) system, New Radio (NR) system, evolved NR system, LTE-based access to unlicensed spectrum (LTE-U) system, NR-U system, Universal Mobile Telecommunication System (UMTS), Worldwide Interoperability for Microwave Access (WiMAX) communication system, Wireless Local Area Network (WLAN), Wireless Fidelity (WiFi), next-generation communication system, or any other communication system, etc.

Generally, traditional communication systems support a limited number of connections and are easy to implement. However, with the development of communication technology, mobile communication systems will support not only traditional communication, but also for example Device to Device (D2D) communication, Machine to Machine (M2M) communication, Machine Type Communication (MTC), and Vehicle to Vehicle (V2V) communication, etc. The embodiments of the present disclosure can also be applied to these communication systems.

The system architecture and service scenarios described in the embodiments of the present disclosure are intended to illustrate the technical solutions of the embodiments of the present disclosure more clearly, and do not constitute any limitation on the technical solutions according to the embodiments of the present disclosure. It can be appreciated by those of ordinary skill in the art that with the evolution of the network architecture and the emergence of new service scenarios, the technical solutions according to the embodiments of the present disclosure will be equally applicable to similar technical problems.

The network device in the embodiments of the present disclosure may be an ordinary base station (such as a NodeB or eNB or gNB), a New Radio (NR) controller, a centralized unit, an NR base station, a remote radio module, a micro base station, a relay, a distributed unit, a Transmission Reception Point (TRP), a Transmission Point (TP), or any other device. The embodiments of the present disclosure is not limited to any specific technology or any specific device form adopted by the network device. For the purpose of description, in all the embodiments of the present disclosure, the above apparatuses that provide wireless communication functions for terminal devices are collectively referred to as network devices.

In the embodiments of the present disclosure, the terminal device may be any terminal. For example, the terminal device may be a user equipment of machine type communication. In other words, the terminal device can also be referred to as User Equipment (UE), Mobile Station (MS), mobile terminal, terminal, etc., and the terminal device can communicate with one or more core networks via a Radio Access Network (RAN). For example, the terminal device can be a mobile phone (or referred to as a "cellular" phone), a computer with a mobile terminal, etc. For example, the terminal device can also be a portable, pocket-sized, handheld, computer-built-in, or vehicle-mounted mobile device that can exchange language and/or data with the radio access network. The embodiments of the present disclosure are not limited to any of these examples.

Optionally, the network device and the terminal device can be deployed on land, including indoor or outdoor, handheld or vehicle-mounted, or on water or on airborne aircraft, balloon, or satellite. The embodiments of the present application are not limited to any application scenarios of the network device and the terminal device.

Optionally, the communication between the network device and the terminal device and between the terminal devices can be carried out on a licensed spectrum, an unlicensed spectrum, or both. The communication between the network device and the terminal device and between the terminal devices can be carried out on the frequency spectrum below 7 gigahertz (GHz), the frequency spectrum above 7 GHz, or both. The embodiments of the present disclosure are not limited to any specific spectral resources used between the network device and the terminal device.

Generally, traditional communication systems support a limited number of connections and are easy to implement. However, with the development of communication technology, mobile communication systems will support not only traditional communication, but also for example Device to Device (D2D) communication, Machine to Machine (M2M) communication, Machine Type Communication (MTC), and Vehicle to Vehicle (V2V) communication, etc. The embodiments of the present disclosure can also be applied to these communication systems.

Figure 2:
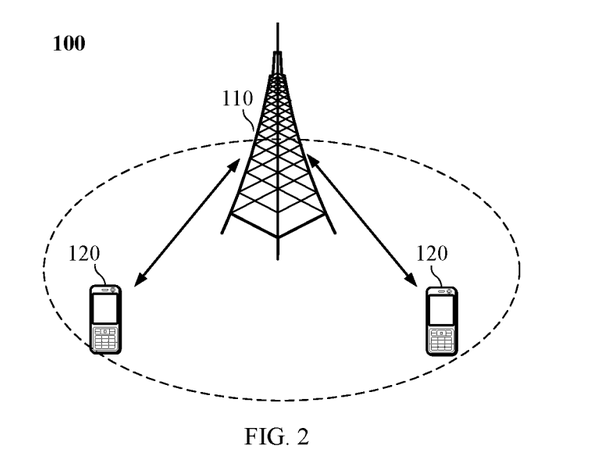
FIG. 2 is a schematic diagram showing a structure of a communication system according to an embodiment of the present disclosure.

Exemplarily, the communication system 100 in which the embodiments of the present disclosure can be applied is shown in FIG. 2. The communication system 100 may include a network device 110, which may be a device that communicates with terminal devices 120 (or referred to as communication terminal or terminal). The network device 110 may provide communication coverage for a specific geographic area, and may communicate with terminal devices located in the coverage area. Optionally, the network device 110 may be a base station such as Base Transceiver Station (BTS) in a GSM system or a CDMA system, a base station such as a NodeB (NB) in a WCDMA system, an evolved base station such as an evolutional Node B (eNB or eNodeB) in an LTE system, or a wireless controller in a Cloud Radio Access Network (CRAN). Alternatively, the network device can be a mobile switching center, a relay station, an access point, a vehicle-mounted device, a wearable device, a hub, a switch, a bridge, a router, a network side device in a 5G network, or a network device in a future evolved Public Land Mobile Network (PLMN), etc.

The communication system 100 also includes at least one terminal device 120 located within the coverage area of the network device 110. As used herein, the "terminal device" may include, but not limited to, an apparatus connected via a wired line, e.g., via a Public Switched Telephone Network (PSTN), a Digital Subscriber Line (DSL), a digital cable, or a direct cable connection, and/or via another data connection/network, and/or via a wireless interface, e.g., for a cellular network, a Wireless Local Area Network (WLAN), a digital TV network such as a Digital Video Broadcasting Handheld (DVB-H) network, a satellite network, an Amplitude Modulation (AM)-Frequency Modulation (FM) broadcast transmitter, and/or another terminal device, and configured to receive/transmit communication signals, and/or an Internet of Things (IoT) device. A terminal device configured to communicate via a wireless interface may be referred to as a "wireless communication terminal", a "wireless terminal", or a "mobile terminal". Examples of the mobile terminal may include, but not limited to, a satellite or cellular phone, a Personal Communications System (PCS) terminal combining cellular radio phone with data processing, fax, and data communication capabilities, a PDA including a radio phone, a pager, Internet/intranet access, a Web browser, a memo pad, a calendar, and/or a Global Positioning System (GPS) receiver, or a conventional laptop and/or palmtop receiver or another electronic device including a radio telephone transceiver. The terminal device may be an access terminal, a User Equipment (UE), a user unit, a user station, a mobile station, a mobile platform, a remote station, a remote terminal, a mobile device, a user terminal, a terminal, a wireless communication device, a user agent, or a user device. Alternatively, the access terminal can be a cellular phone, a cordless phone, a Session Initiation Protocol (SIP) phone, a Wireless Local Loop (WLL) station, a Personal Digital Assistant (PDA), a handheld device or a computing device having a wireless communication function, another processing device connected to a wireless modem, a vehicle-mounted device, a wearable device, a terminal device in a 5G network, or a terminal devices in a future evolved PLMN, etc.

Optionally, direct communication such as Device to Device (D2D) communication may be performed between the terminal devices 120. In the present disclosure, a signal or channel transmitted in the D2D communication may be referred to as a sidelink signal or a sidelink channel, and a transmission opportunity used for transmitting a sidelink signal or a sidelink channel may be referred to as a sidelink transmission opportunity.

Optionally, the 5G system or 5G network may also be referred to as a New Radio (NR) system or NR network.

FIG. 2 exemplarily shows one network device and two terminal devices. Optionally, the communication system 100 may include a plurality of network devices and the coverage of each network device may include a different number of terminal devices. The embodiments of the present disclosure are not limited to this.

Optionally, the communication system 100 may also include other network entities such as a network controller and a mobility management entity. The embodiments of the present disclosure are not limited to this.

It can be appreciated that any device with a communication function in the network/system in the embodiments of the present disclosure may be referred to as a communication device. Taking the communication system 100 shown in FIG. 2 as an example, the communication devices may include the network device 110 and the terminal devices 120, each having a communication function. The network device 110 and the terminal devices 120 may be the specific devices as described above, and details thereof will be omitted here. The communication device may also include other devices in the communication system 100, such as a network controller, a mobility management entity, and other network entities. The embodiments of the present disclosure are not limited to this.

The system architecture and service scenarios described in the embodiments of the present disclosure are intended to illustrate the technical solutions of the embodiments of the present disclosure more clearly, and do not constitute any limitation on the technical solutions according to the embodiments of the present disclosure. It can be appreciated by those of ordinary skill in the art that with the evolution of the network architecture and the emergence of new service scenarios, the technical solutions according to the embodiments of the present disclosure will be equally applicable to similar technical problems.

Figure 3:
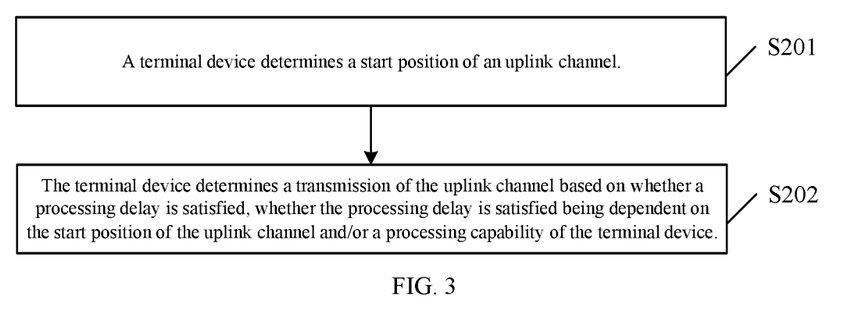
FIG. 3 is a schematic diagram showing an optional processing flow of an uplink transmission method applied in a terminal device according to an embodiment of the present disclosure.

An optional processing procedure of an uplink transmission method applied in a terminal device according to an embodiment of the present disclosure, as shown in FIG. 3, includes at least part of the following content.

At step S201, a terminal device determines a start position of an uplink channel.

In some embodiments, a network device can transmit scheduling information to the terminal device, and the terminal device can determine the start position of the uplink channel to be transmitted based on the scheduling information.

At step S202, the terminal device determines a transmission of the uplink channel based on whether a processing delay is satisfied. Whether the processing delay is satisfied is dependent on the start position of the uplink channel and/or a processing capability of the terminal device.

In some embodiments, the operation of determining the transmission of the uplink channel may include determining whether to transmit the uplink channel, or determining information or data to be carried in the transmitted uplink channel.

Here, the start position of the uplink channel may include a first start position of a CP of the first symbol in the uplink channel, and/or the start position of the uplink channel may include a second start position of an ECP of the first symbol in the uplink channel.

The second start position may be determined depending on a first parameter C and/or a second parameter Δ. The ECP may have a length dependent on the first parameter C and/or the second parameter Δ. The length of the ECP may be a length between the second start position and the first start position.

In some embodiments, the first parameter C may be dependent on a subcarrier spacing. For example, the first parameter C may be determined to be one of C1, C2, and C3, depending on the start position of the uplink channel transmitted by the terminal device. For different subcarrier spacings, the value of C1 can be different, the value of C2 can be different, and the value of C3 can also be different. For example, when the subcarrier spacing is 15 kHz, the value of C1 may be 1; when the subcarrier spacing is 30 kHz, the value of C1 may be 1; or when the subcarrier spacing is 60 kHz, the value of C1 may be 2. Here, the first parameter may be in units of number of symbols, and the first parameter may have a value greater than or equal to 0.

In some embodiments, the second parameter Δ may be determined, based on the start position of the uplink channel transmitted by the terminal device, to be 0, 16 microseconds, 25 microseconds, 16 microseconds+Timing Advance (TA), and 25 microseconds+TA; where the TA is a timing advance corresponding to the transmission of the uplink channel. The second parameter may be in units of microseconds.

The uplink transmission method according to the embodiment of the present disclosure will be described below with respect to different types of uplink channels.

Figure 4:
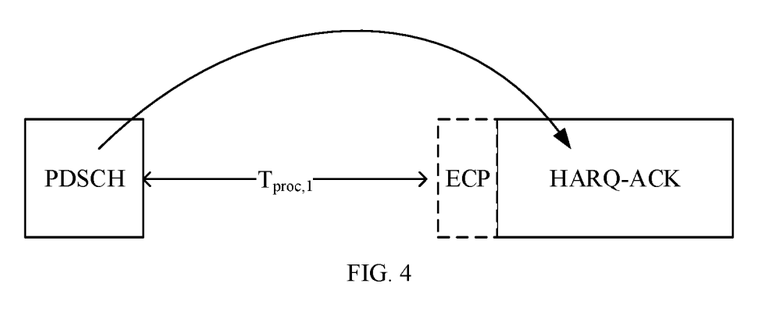
FIG. 4 is an optional schematic diagram of first processing time according to an embodiment of the present disclosure.
Figure 5:
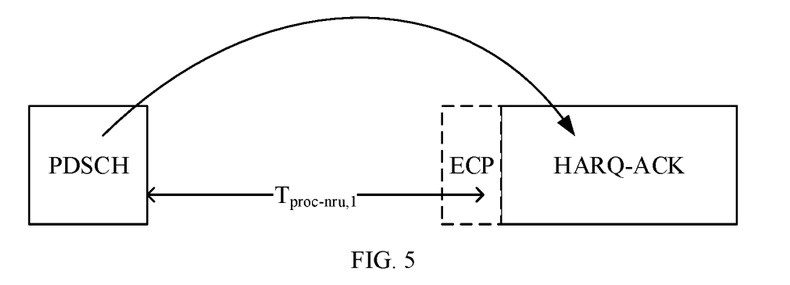
FIG. 5 is another optional schematic diagram of first processing time according to an embodiment of the present disclosure.

In some embodiments, the uplink channel may be an uplink channel carrying first Hybrid Automatic Repeat reQuest-Acknowledgement (HARQ-ACK) information corresponding to a first Physical Downlink Shared Channel (PDSCH). As shown in FIG. 4, if a time length between an end position of the last symbol of the first PDSCH received by the terminal device and the first start position of the CP of the first symbol in the uplink channel is greater than first processing time, the terminal device may determine that the processing delay is satisfied; or otherwise, the terminal device may determine that the processing delay is not satisfied. Alternatively, as shown in FIG. 5, if a time length between the end position of the last symbol of the first PDSCH received by the terminal device and the second start position of the ECP of the first symbol in the uplink channel is greater than the first processing time, the terminal device may determine that the processing delay is satisfied; or otherwise, the terminal device may determine that the processing delay is not satisfied.

Here, the first processing time may be determined depending on the start position of the uplink channel and/or the processing capability of the terminal device, and the first processing time may include: $T_{proc,1} = (N_1+d_{1,1})(2048+144)\cdot\kappa 2^{-\mu}\cdot T_C$, or $T_{proc\text{-}nru,1} = (N_1+d_{1,1}+C)(2048+144)\cdot\kappa 2^{-\mu}\cdot T_C$, or $T_{proc\text{-}nru,1} = (N_1+d_{1,1}+C)(2048+144)\cdot\kappa 2^{-\mu}\cdot T_C - \text{ceil}(\Delta/(\kappa 2^{-\mu}\cdot T_C))\cdot \kappa 2^{-\mu}\cdot T_C$.

If the processing delay is satisfied, the terminal device may determine that the transmitted uplink channel includes a valid first HARQ-ACK information. If the processing delay is not satisfied, the terminal device may determine that the transmitted uplink channel does not include the valid first HARQ-ACK information.

Optionally, the terminal device may determine the uplink channel to be the uplink channel carrying the first HARQ-ARK information according to downlink grant information transmitted by the network device. For example, the terminal device may receive the downlink grant information transmitted by the network device, and the downlink grant information may be used to schedule the terminal device to receive the first PDSCH carrying a target transport block. The terminal device can determine that the first HARQ-ACK information corresponding to the scheduled first PDSCH is transmitted via a PUCCH according to allocated HARQ-ACK timing information K1 and PUCCH resource indication information.

When the uplink channel is the PUCCH, if the time length between the end position of the last symbol of the first PDSCH and the first start position of the CP of the first symbol in the PUCCH is greater than the first processing time, or if the time length between the end position of the last symbol of the first PDSCH and the first start position of the ECP of the first symbol in the PUCCH is greater than the first processing time, the terminal device can determine that the uplink channel includes the valid first HARQ-ACK information.

It can also be appreciated that, when the start position of the first symbol in the PUCCH, with the influence of timing advance taken into account, is not earlier than Symbol L1', the terminal device can determine that the uplink channel includes the valid first HARQ-ACK information. Here, Symbol L1' may be the next uplink symbol after the end position of the last symbol of the first PDSCH. The CP position of the next uplink symbol after the end position of the last symbol of the first PDSCH is $T_{proc,1}$ or $T_{proc\text{-}nru,1}$; or the ECP position of the next uplink symbol after the end position of the last symbol of the first PDSCH is $T_{proc,1}$ or $T_{proc\text{-}nru,1}$.

Figure 6:
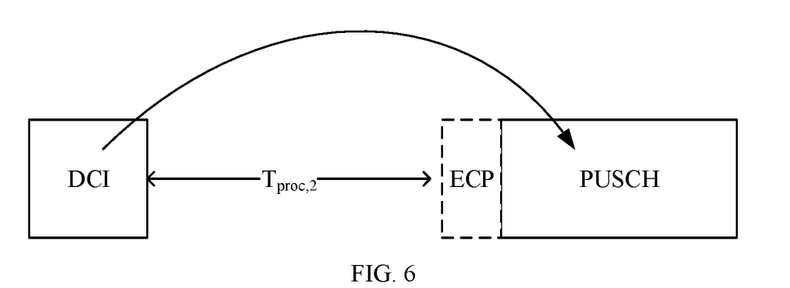
FIG. 6 is an optional schematic diagram of second processing time according to an embodiment of the present disclosure.
Figure 7:
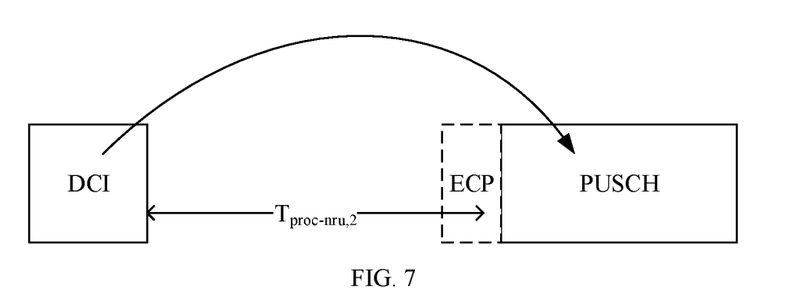
FIG. 7 is another optional schematic diagram of second processing time according to an embodiment of the present disclosure.

In other embodiments, the uplink channel may be a first PUSCH carrying a target transport block and/or a DMRS, and the first PUSCH is scheduled by a first PDCCH. As shown in FIG. 6, if a time length between an end position of the last symbol of the first PDCCH carrying a DCI as received by the terminal device and the first start position of the CP of the first symbol in the uplink channel is greater than second processing time, the terminal device can determine that the processing delay is satisfied; or otherwise, the terminal device can determine that the processing delay is not satisfied. Alternatively, as shown in FIG. 7, if a time length between the end position of the last symbol of the first PDCCH carrying the DCI as received by the terminal device and the second start position of the ECP of the first symbol in the uplink channel is greater than the second processing time, the terminal device can determine that the processing delay is satisfied; or otherwise, the terminal device can determine that the processing delay is not satisfied.

Here, the second processing time may be determined depending on the start position of the uplink channel and/or the processing capability of the terminal device, and the second processing time may include: $T_{proc,2} = \max((N_2+d_{2,1})(2048+144)\cdot\kappa 2^{-\mu}\cdot T_C, d_{2,2})$, or $T_{proc\text{-}nru,2} = \max((N_2+d_{2,1}+C)(2048+144)\cdot\kappa 2^{-\mu}\cdot T_C, d_{2,2})$, or $T_{proc\text{-}nru,2} = \max((N_2+d_{2,1}+C)(2048+144)\cdot\kappa 2^{-\mu}\cdot T_C - \text{ceil}(\Delta/(k2^{-\mu}\cdot T_C))\cdot \kappa 2^{-\mu}\cdot T_C, d_{2,2})$.

If the processing delay is satisfied, the terminal device may determine to transmit the uplink channel. If the processing delay is not satisfied, the terminal device may refrain from transmitting the uplink channel. Alternatively, if the processing delay is not satisfied, the terminal device may ignore the first PDCCH.

Optionally, the terminal device may determine the uplink channel to be the uplink channel carrying the target transport block and/or DMRS according to uplink grant information transmitted by the network device. For example, the terminal device may receive the uplink grant information transmitted by the network device, and the uplink grant information may be used to schedule the terminal device to transmit the first PUSCH carrying the target transport block and/or DMRS.

When the uplink channel is the first PUSCH and the first PUSCH is scheduled by the first PDCCH, if the terminal device determines, based on an SLIV indication in the uplink grant information, that the time length between the end position of the last symbol of the first PDCCH and the first start position of the CP of the first symbol of the first PUSCH is greater than the second processing time, or the time length between the end position of the last symbol of the first PDCCH and the first start position of the ECP of the first symbol of the PUSCH is greater than the second processing time, the terminal device can determine to transmit the first PUSCH.

It can also be appreciated that the terminal device may determine to transmit the first PUSCH when the start position of the first symbol in the first PUSCH, with the influence of timing advance taken into account, is not earlier than Symbol L2'. Here, Symbol L2' may be the next uplink symbol after the end position of the last symbol of the first PDCCH. The start position of the CP of the next uplink symbol after the end position of the last symbol of the first PDCCH is $T_{proc,2}$ or $T_{proc\text{-}nru,2}$; or the start position of the ECP of the next uplink symbol after the end position of the last symbol of the first PDCCH is $T_{proc,2}$ or $T_{proc\text{-}nru,2}$.

In some other embodiments, the uplink channel may be a second PUSCH carrying Channel State Information (CSI), and reporting of the CSI may be triggered by a second PDCCH. If a time length between an end position of the last symbol of the second PDCCH received by the terminal device and the first start position of the CP of the first symbol in the uplink channel is greater than third processing time, the terminal device may determine that the processing delay is satisfied; or otherwise, the terminal device may determine that the delay is not satisfied. Alternatively, if a time length between the end position of the last symbol of the first PDCCH received by the terminal device and the second start position of the ECP of the first symbol in the uplink channel is greater than the third processing time, the terminal device may determine that the processing delay is satisfied; or otherwise the terminal device may determine that the delay is not satisfied.

Here, the third processing time may be determined depending on the start position of the uplink channel and/or the processing capability of the terminal device, and the third processing time may include $T_{proc,CSI}$ or $T_{proc-nru,CSI}$. Here $T_{proc,CSI}=(Z)(2048+144)\cdot\kappa 2^{-\mu}\cdot T_C$, or $T_{proc-nru,CSI}=(Z+C)(2048+144)\cdot\kappa 2^{-\mu}\cdot T_C$, or $T_{proc-nru,CSI}=(Z+C)(2048+144)\cdot\kappa 2^{-\mu}\cdot T_C-\text{ceil}(\Delta/(\kappa 2^{-\mu}\cdot T_C))\cdot\kappa 2^{-\mu}\cdot T_C$.

If the processing delay is satisfied, the terminal device may determine that the uplink channel includes the valid CSI. If the processing delay is not satisfied, the terminal device may determine that the uplink channel does not include the valid CSI.

Optionally, the CSI report may be the n-th CSI report. If a time length between an end position of a reference symbol received by the terminal device and the first start position of the CP of the first symbol in the uplink channel is greater than fourth processing time, the terminal device may determine that the processing delay is satisfied; or otherwise, the terminal device may determine that the delay is not satisfied. Alternatively, if a time length between the end position of the reference symbol received by the terminal device and the second start position of the ECP of the first symbol in the uplink channel is greater than the fourth processing time, the terminal device may determine that the processing delay is satisfied; or otherwise, the terminal device may determine that the delay is not satisfied. The reference symbol is the last symbol of an aperiodic CSI Reference Signal (CSI-RS) resource for channel measurement, an aperiodic CSI Interference Measurement (CSI-IM) resource for interference measurement, or an aperiodic Non-Zero Power (NZP) CSI-RS resource for interference measurement, corresponding to the n-th CSI report, whichever occurs last.

Here, the fourth processing time may be determined depending on the start position of the uplink channel and/or the processing capability of the terminal device, and the fourth processing time may include $T'_{proc,CSI}$ or $T'_{proc-nru,CSI}$. Here $T'_{proc,CSI}=(Z')(2048+144)\cdot\kappa 2^{-\mu}\cdot T_C$, or $T'_{proc-nru,CSI}=(Z'+C)(2048+144)\cdot\kappa 2^{-\mu}\cdot T_C$, or $T'_{proc-nru,CSI}=(Z'+C)(2048+144)\cdot\kappa 2^{-\mu}\cdot T_C-\text{ceil}(\Delta/(\kappa 2^{-\mu}\cdot T_C))\cdot\kappa 2^{-\mu}\cdot T_C$.

If the processing delay is satisfied, the terminal device may determine that the uplink channel includes the valid CSI corresponding to the n-th CSI report; or otherwise, the terminal device may determine that the uplink channel includes the valid CSI corresponding to the (n−1)-th CSI report.

Optionally, the terminal device may determine the uplink channel to be the second PUSCH carrying the CSI according to DCI transmitted by the network device, and the DCI may be carried on the second PDCCH. When a CSI request field in the DCI triggers the reporting of the CSI on the first PUSCH, the terminal device may transmit the valid CSI report for the n-th request for triggering the reporting of the CSI.

When the uplink channel is the second PUSCH, if the time length between the end position of the last symbol of the second PDCCH and the first start position of the CP of the first symbol in the second PUSCH is greater than the third processing time or the time length between the end position of the last symbol of the second PDCCH and the first start position of the ECP of the first symbol in the second PUSCH is greater than the third processing time, and if the time length between the end position of the reference symbol received by the terminal device and the first start position of the CP of the first symbol in the second PUSCH is greater than the fourth processing time or the time length between the end position of the reference symbol received by the terminal device and the first start position of the ECP of the first symbol in the second PUSCH is greater than the fourth processing time, then the terminal device may determine that the uplink channel includes the valid CSI corresponding to the n-th CSI report; or otherwise, the terminal device may determine that the uplink channel does not include the valid CSI corresponding to the n-th CSI report.

It can also be appreciated that when the CSI report is the n-th CSI report, the start position of the first symbol in the second PUSCH, with the influence of timing advance taken into account, is not earlier than Symbol $Z_{ref-nru}$, and the start position of the reference signal received by the terminal device, with the influence of timing advance taken into account, is not earlier than Symbol $Z'_{ref-nru}(n)$, then the terminal device may determine to transmit the second PUSCH. The reference symbol is the last symbol of an aperiodic CSI-RS resource for channel measurement, an aperiodic CSI-IM resource for interference measurement, or an aperiodic NZP CSI-RS resource for interference measurement, corresponding to the n-th CSI report, whichever occurs last.

Optionally, Symbol $Z_{ref-nru}$ may be the next uplink symbol after the end position of the last symbol of the second PDCCH, and the start position of the CP of the next uplink symbol after the end position of the last symbol of the second PDCCH is $T_{proc,CSI}$ or $T_{proc-nru,CSI}$; or the start position of the ECP of the next uplink symbol after the end position of the last symbol of the second PDCCH is $T_{proc,CSI}$ or $T_{proc-nru,CSI}$ Symbol $Z'_{ref-nru}(n)$ may be the next uplink symbol after the reference symbol, and the start position of the CP of the next uplink symbol after the reference symbol is $T'_{proc,CSI}$ or $T'_{proc-nru,CSI}$; or the start position of the ECP of the next uplink symbol after the reference symbol is $T'_{proc,CSI}$ or $T'_{proc-nru,CSI}$.

In summary, the determination as to whether the processing delay is satisfied according to the start position of the uplink channel and/or the processing capability of the terminal device can be expressed as $T_{proc-nru}=f(T_{proc},C,\Delta)$.

Here, depending on different application scenarios, $T_{proc}$ may be one of $T_{proc,1}$, $T_{proc-nru,1}$, $T_{proc,2}$, $T_{proc-nru,2}$, $T_{proc,CSI}$, $T_{proc-nru,CSI}$, $T'_{proc,CSI}$, and $T'_{proc-nru,CSI}$. C can be determined as one of C1, C2, and C3 depending on the start position of the uplink channel transmitted by the terminal device, and $\Delta$ can be determined as one of 0, 16 microseconds, 25 microseconds, 16 microseconds seconds+TA, or 25 microseconds+TA, based on the start position of the uplink channel transmitted by the terminal device.

Figure 8:
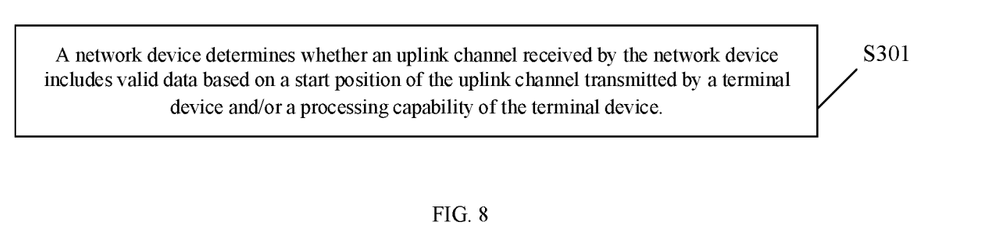
FIG. 8 is a schematic diagram showing an optional processing flow of an uplink transmission method applied in a network device according to an embodiment of the present disclosure.

An optional processing procedure of an uplink transmission method applied in a network device according to an embodiment of the present disclosure, as shown in FIG. 8, includes at least part of the following content.

At step S301, a network device determines whether an uplink channel received by the network device includes valid data based on a start position of the uplink channel transmitted by a terminal device and/or a processing capability of the terminal device.

In some embodiments, the start position of the uplink channel may include a first start position of a CP of the first symbol in the uplink channel, and/or the start position of the uplink channel may include a second start position of an ECP of the first symbol in the uplink channel.

In some embodiments, the second start position may be determined depending on a first parameter and/or a second parameter, and/or the ECP may have a length dependent on the first parameter and/or the second parameter, and the length of the ECP may be a length between the second start position and the first start position. The first parameter may be in units of number of symbols, the first parameter may have a value greater than or equal to 0, and the second parameter may be in units of microseconds.

In some embodiments, the first parameter C may be dependent on a subcarrier spacing. For example, the first parameter C may be determined to be one of C1, C2, and C3, depending on the start position of the uplink channel transmitted by the terminal device. For different subcarrier spacings, the value of C1 can be different, the value of C2 can be different, and the value of C3 can also be different. For example, when the subcarrier spacing is 15 kHz, the value of C1 may be 1; when the subcarrier spacing is 30 kHz, the value of C1 may be 1; or when the subcarrier spacing is 60 kHz, the value of C1 may be 2. Here, the first parameter may be in units of number of symbols, and the first parameter may have a value greater than or equal to 0.

In some embodiments, the second parameter Δ may be determined to be 0, 16 microseconds, 25 microseconds, 16 microseconds+Timing Advance (TA), and 25 microseconds+TA, based on the start position of the uplink channel transmitted by the terminal device; where the TA is a timing advance corresponding to the transmission of the uplink channel. The second parameter may be in units of microseconds.

The uplink transmission method according to the embodiment of the present disclosure will be described below with respect to different types of uplink channels.

In some embodiments, the uplink channel may be an uplink channel carrying first HARQ-ARK information corresponding to a first PDSCH. If a time length between an end position of the last symbol of the first PDSCH received by the terminal device and the first start position of the CP of the first symbol in the uplink channel is greater than first processing time, the network device may determine that the uplink channel includes the valid first HARQ-ACK information; or otherwise, the network device may determine that the uplink channel does not include the valid first HARQ-ACK information. Alternatively, if a time length between the end position of the last symbol of the first PDSCH received by the terminal device and the second start position of the ECP of the first symbol in the uplink channel is greater than the first processing time, the network device may determine that the uplink channel includes the valid first HARQ-ACK information; or otherwise, the network device may determine that the uplink channel does not include the valid first HARQ-ACK information.

Here, the first processing time may be determined depending on the start position of the uplink channel and/or the processing capability of the terminal device, and the first processing time may include: $T_{proc,1}=(N_1+d_{1,1})(2048+144)\cdot\kappa 2^{-\mu}\cdot T_C$, or $T_{proc-nru,1}=(N_1+d_{1,1}+C)(2048+144)\cdot\kappa 2^{-\mu}\cdot T_C$, or $T=(N_1+d_{1,1}+C)(2048+144)\cdot\kappa 2^{-\mu}\cdot T_C-\text{ceil}(\Delta/(\kappa 2^{-\mu}\cdot T_C))\cdot\kappa 2^{-\mu}\cdot T_C$.

In other embodiments, the uplink channel may be a first PUSCH carrying a target transport block and/or a DMRS, and the first PUSCH is scheduled by a first PDCCH. If a time length between an end position of the last symbol of the first PDCCH transmitted by the network device and the first start position of the CP of the first symbol in the uplink channel is greater than second processing time, or a time length between the end position of the last symbol of the first PDCCH transmitted by the network device and the second start position of the ECP of the first symbol in the uplink channel is greater than the second processing time, the network device may determine that the uplink channel includes the valid data.

Here, the second processing time may be determined depending on the start position of the uplink channel and/or the processing capability of the terminal device, and the second processing time may include: $T_{proc,2}=\max((N_2+d_{2,1})(2048+144)\cdot\kappa 2^{-\mu}\cdot T_C, d_{2,2})$, or $T_{proc-nru,2}=\max((N_2+d_{2,1}+C)(2048+144)\cdot\kappa 2^{-\mu}\cdot T_C, d_{2,2})$, or $T_{proc-nru,2}=\max((N_2+d_{2,1}+C)(2048+144)\cdot\kappa 2^{-\mu}\cdot T_C-\text{ceil}(\Delta/(\kappa 2^{-\mu}\cdot T_C))\cdot\kappa 2^{-\mu}\cdot T_C, d_{2,2})$.

In some other embodiments, the uplink channel may be a second PUSCH carrying CSI, and reporting of the CSI may be triggered by a second PDCCH. If a time length between an end position of the last symbol of the second PDCCH transmitted by the network device and the first start position of the CP of the first symbol in the uplink channel is greater than third processing time, or the time length between the end position of the last symbol of the first PDCCH transmitted by the network device and the second start position of the ECP of the first symbol in the uplink channel is greater than the third processing time, the network device may determine that the uplink channel includes the valid CSI; or otherwise, the network device may determine that the uplink channel does not include the valid CSI.

Here, the third processing time may be determined depending on the start position of the uplink channel and/or the processing capability of the terminal device, and the third processing time may include: $T_{proc,CSI}=(Z)(2048+144)\cdot\kappa 2^{-\mu}\cdot T_C$, or $T_{proc-nru,CSI}=(Z+C)(2048+144)\cdot\kappa 2^{-\mu}\cdot T_C$, or $T_{proc-nru,CSI}=(Z+C)(2048+144)\cdot\kappa 2^{-\mu}\cdot T_C-\text{ceil}(\Delta/(\kappa 2^{-\mu}\cdot T_C))\cdot\kappa 2^{-\mu}\cdot T_C$.

Optionally, the CSI report may be the n-th CSI report. If a time length between an end position of a reference symbol transmitted by the network device and the first start position of the CP of the first symbol in the uplink channel is greater than fourth processing time, or a time length between the end position of the reference symbol transmitted by the network device and the second start position of the ECP of the first symbol in the uplink channel is greater than the fourth processing time, the network device may determine that the uplink channel includes the valid CSI corresponding to the n-th CSI report; or otherwise, the network device may determine that the uplink channel includes the valid CSI corresponding to the (n−1)-th CSI report.

Here, the reference symbol may be the last symbol of an aperiodic CSI-RS resource for channel measurement, an aperiodic CSI-IM resource for interference measurement, or an aperiodic NZP CSI-RS resource for interference measurement, corresponding to the n-th CSI report, whichever occurs last.

Here, the fourth processing time may be determined depending on the start position of the uplink channel and/or the processing capability of the terminal device, and the fourth processing time may include: $T'_{proc,CSI}=(Z')(2048+144)\cdot\kappa 2^{-\mu}\cdot T_C$, or $T'_{proc-nru,CSI}=(Z'+C)(2048+144)\cdot\kappa 2^{-\mu}\cdot T_C$, or $T'_{proc-nru,CSI}=(Z'+C)(2048+144)\cdot\kappa 2^{-\mu}\cdot T_C-\text{ceil}(\Delta/(\kappa 2^{-\mu}\cdot T_C))\cdot\kappa 2^{-\mu}\cdot T_C$.

It can be appreciated that, in the various method embodiments of the present disclosure, the values of the sequence numbers of the above processes does not mean the order in which they are performed. The order in which the respective processes are to be performed should be determined by their functions and internal logics, and should not constitute any limitation on the implementation of the embodiments of the present disclosure.

Figure 9:
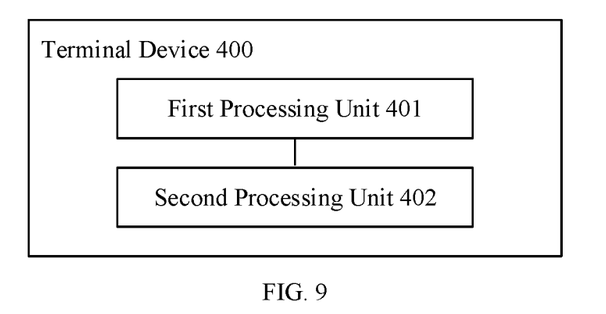
FIG. 9 is a schematic diagram showing a structure of a terminal device according to an embodiment of the present disclosure.

In order to implement the uplink transmission method in the above embodiment, an embodiment of the present disclosure further provides a terminal device. The terminal device 400 has a structure as shown in FIG. 9, including: a first processing unit 401 configured to determine a start position of an uplink channel; and a second processing unit 402 configured to determine a transmission of the uplink channel based on whether a processing delay is satisfied.

Whether the processing delay is satisfied is dependent on the start position of the uplink channel and/or a processing capability of the terminal device.

In some embodiments, the start position of the uplink channel may include a first start position of a CP of the first symbol in the uplink channel, and/or the start position of the uplink channel may include a second start position of an ECP of the first symbol in the uplink channel.

In some embodiments, the second start position may be determined depending on a first parameter and/or a second parameter, and/or the ECP may have a length dependent on the first parameter and/or the second parameter, and the length of the ECP may be a length between the second start position and the first start position. The first parameter may be in units of number of symbols, the first parameter may have a value greater than or equal to 0, and the second parameter may be in units of microseconds.

In some embodiments, the value of the first parameter may be dependent on a subcarrier spacing.

In some embodiments, the second parameter may have a value including at least one of: 0, 16 microseconds, 25 microseconds, 16 microseconds+TA, and 25 microseconds+TA. Here, the TA is a timing advance corresponding to the transmission of the uplink channel.

In some embodiments, the uplink channel may be an uplink channel carrying first HARQ-ACK information corresponding to a first PDSCH. The processing delay being satisfied may include: a time length between an end position of the last symbol of the first PDSCH received by the terminal device and the first start position of the CP of the first symbol in the uplink channel being greater than first processing time, or a time length between the end position of the last symbol of the first PDSCH received by the terminal device and the second start position of the ECP of the first symbol in the uplink channel being greater than the first processing time.

In some embodiments, the first processing time may be determined depending on the start position of the uplink channel and/or the processing capability of the terminal device, and the first processing time may include:

$$T_{proc,1}=(N_1+d_{1,1})(2048+144)\cdot\kappa 2^{-\mu}\cdot T_C, \text{ or}$$

$$T_{proc-nru,1}=(N_1+d_{1,1}+C)(2048+144)\cdot\kappa 2^{-\mu}\cdot T_C, \text{ or}$$

$$T_{proc-nru,1}=(N_1+d_{1,1}+C)(2048+144)\cdot\kappa 2^{-\mu}\cdot T_C-\text{ceil}(\Delta/(\kappa 2^{-\mu}\cdot T_C))\cdot\kappa 2^{-\mu}\cdot T_C.$$

In some embodiments, the second processing unit 402 may be configured to determine that the uplink channel includes the valid first HARQ-ACK information when the processing delay is satisfied, or determine that the uplink channel does not include the valid first HARQ-ACK information when the processing delay is not satisfied.

In some embodiments, the uplink channel may be a first PUSCH carrying a target transport block and/or a DMRS. The first PUSCH is scheduled by a first PDCCH. The processing delay being satisfied may include: a time length between an end position of the last symbol of the first PDCCH received by the terminal device and the first start position of the CP of the first symbol in the uplink channel being greater than second processing time, or a time length between the end position of the last symbol of the first PDCCH received by the terminal device and the second start position of the ECP of the first symbol in the uplink channel being greater than the second processing time.

In some embodiments, the second processing time may be determined depending on the start position of the uplink channel and/or the processing capability of the terminal device, and the second processing time may include:

$$T_{proc,2}=\max((N_2+d_{2,1})(2048+144)\cdot\kappa 2^{-\mu}\cdot T_C, d_{2,2}), \text{ or}$$

$$T_{proc-nru,2}=\max((N_2+d_{2,1}+C)(2048+144)\cdot\kappa 2^{-\mu}\cdot T_C, d_{2,2}), \text{ or}$$

$$T_{proc-nru,2}=\max((N_2+d_{2,1}+C)(2048+144)\cdot\kappa 2^{-\mu}\cdot T_C-\text{ceil}(\Delta/(\kappa 2^{-\mu}\cdot T_C))\cdot\kappa 2^{-\mu}\cdot T_C, d_{2,2})$$

In some embodiments, the second processing unit 402 may be configured to determine to transmit the uplink channel when the processing delay is satisfied, or refrain from transmitting the uplink channel when the processing delay is not satisfied.

In some embodiments, the uplink channel may be a second PUSCH carrying CSI. Reporting of the CSI is triggered by a second PDCCH. The processing delay being satisfied may include: a time length between an end position of the last symbol of the second PDCCH received by the terminal device and the first start position of the CP of the first symbol in the uplink channel being greater than third processing time, or a time length between the end position of the last symbol of the first PDCCH received by the terminal device and the second start position of the ECP of the first symbol in the uplink channel being greater than the third processing time.

In some embodiments, the third processing time may be determined depending on the start position of the uplink channel and/or the processing capability of the terminal device, and the third processing time may include:

$$T_{proc,CSI}=(Z)(2048+144)\cdot\kappa 2^{-\mu}\cdot T_C, \text{ or}$$

$$T_{proc-nru,CSI}=(Z+C)(2048+144)\cdot\kappa 2^{-\mu}\cdot T_C, \text{ or}$$

$$T_{proc-nru,CSI}=(Z+C)(2048+144)\cdot\kappa 2^{-\mu}\cdot T_C-\text{ceil}(\Delta/(\kappa 2^{-\mu}\cdot T_C))\cdot\kappa 2^{-\mu}\cdot T_C.$$

In some embodiments, the second processing unit 402 may be configured to determine that the uplink channel includes the valid CSI when the processing delay is satisfied, or determine that the uplink channel does not include the valid CSI when the processing delay is not satisfied.

In some embodiments, the CSI report may be the n-th CSI report. The processing delay being satisfied may further include: a time length between an end position of a reference symbol received by the terminal device and the first start position of the CP of the first symbol in the uplink channel being greater than fourth processing time; or, a time length between the end position of the reference symbol received by the terminal device and the second start position of the ECP of the first symbol in the uplink channel being greater than the fourth processing time.

Here, the reference symbol is the last symbol of an aperiodic CSI-RS resource for channel measurement, an aperiodic CSI-IM resource for interference measurement, or an aperiodic NZP CSI-RS resource for interference measurement, corresponding to the n-th CSI report, whichever occurs last.

In some embodiments, the fourth processing time may be determined depending on the start position of the uplink channel and/or the processing capability of the terminal device, and the fourth processing time may include:

$$T'_{proc,CSI} = (Z')(2048+144) \cdot \kappa 2^{-\mu} \cdot T_C, \text{ or}$$

$$T'_{proc\text{-}nru,CSI} = (Z'+C)(2048+144) \cdot \kappa 2^{-\mu} \cdot T_C, \text{ or}$$

$$T'_{proc\text{-}nru,CSI} = (Z'+C)(2048+144) \cdot \kappa 2^{-\mu} \cdot T_C - \text{ceil}(\Delta/(\kappa 2^{-\mu} \cdot T_C)) \cdot \kappa 2^{-\mu} \cdot T_C.$$

In some embodiments, the second processing unit 402 may be configured to determine that the uplink channel includes the valid CSI corresponding to the n-th CSI report when the processing delay is satisfied, or determine that the uplink channel includes the valid CSI corresponding to the (n−1)-th CSI report when the processing delay is not satisfied.

Figure 10:
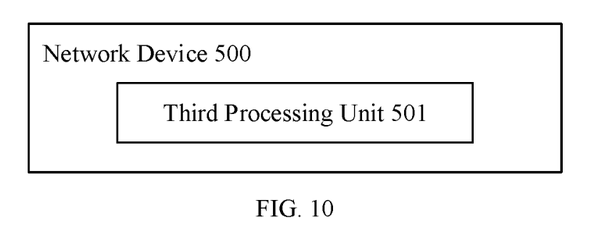
FIG. 10 is a schematic diagram showing a structure of a network device according to an embodiment of the present disclosure.

In order to implement the uplink transmission method in the above embodiment, an embodiment of the present disclosure further provides a network device. The network device 500 has a structure as shown in FIG. 10, including: a third processing unit 501 configured to determine whether an uplink channel received by the network device includes valid data based on a start position of the uplink channel transmitted by a terminal device and/or a processing capability of the terminal device.

In some embodiments, the start position of the uplink channel may include a first start position of a CP of the first symbol in the uplink channel, and/or the start position of the uplink channel may include a second start position of an ECP of the first symbol in the uplink channel.

In some embodiments, the second start position may be determined depending on a first parameter and/or a second parameter, and/or the ECP may have a length dependent on the first parameter and/or the second parameter, and the length of the ECP may be a length between the second start position and the first start position. The first parameter may be in units of number of symbols, the first parameter may have a value greater than or equal to 0, and the second parameter may be in units of microseconds.

In some embodiments, the value of the first parameter may be dependent on a subcarrier spacing.

In some embodiments, the second parameter may have a value including at least one of: 0, 16 microseconds, 25 microseconds, 16 microseconds+TA, and 25 microseconds+TA. Here, the TA is a timing advance corresponding to the transmission of the uplink channel.

In some embodiments, the uplink channel may be an uplink channel carrying first HARQ-ACK information corresponding to a first PDSCH. The third processing unit 501 may be configured to: determine that the uplink channel includes the valid first HARQ-ACK information when a time length between an end position of the last symbol of the first PDSCH transmitted by the network device and the first start position of the CP of the first symbol in the uplink channel is longer than the first processing time, or a time length between the end position of the last symbol of the first PDSCH transmitted by the network device and the second start position of the ECP of the first symbol in the uplink channel is greater than the first processing time, or otherwise determine that the uplink channel does not include the valid first HARQ-ACK information.

In some embodiments, the first processing time may be determined depending on the start position of the uplink channel and/or the processing capability of the terminal device, and the first processing time may include:

$$T_{proc,1} = (N_1+d_{1,1})(2048+144) \cdot \kappa 2^{-\mu} \cdot T_C, \text{ or}$$

$$T_{proc\text{-}nru,1} = (N_1+d_{1,1}+C)(2048+144) \cdot \kappa 2^{-\mu} \cdot T_C, \text{ or}$$

$$T_{proc\text{-}nru,1} = (N_1+d_{1,1}+C)(2048+144) \cdot \kappa 2^{-\mu} \cdot T_C - \text{ceil}(\Delta/(\kappa 2^{-\mu} \cdot T_C)) \cdot \kappa 2^{-\mu} \cdot T_C.$$

In some embodiments, the uplink channel may be a first PUSCH carrying a target transport block and/or a DMRS. The first PUSCH is scheduled by a first PDCCH. The third processing unit 501 may be configured to: determine that the uplink channel includes the valid data when a time length between an end position of the last symbol of the first PDCCH transmitted by the network device and the first start position of the CP of the first symbol in the uplink channel is greater than second processing time, or a time length between the end position of the last symbol of the first PDCCH transmitted by the network device and the second start position of the ECP of the first symbol in the uplink channel is greater than the second processing time.

In some embodiments, the second processing time may be determined depending on the start position of the uplink channel and/or the processing capability of the terminal device, and the second processing time may include:

$$T_{proc,2} = \max((N_2+d_{2,1})(2048+144) \cdot \kappa 2^{-\mu} \cdot T_C, d_{2,2}), \text{ or}$$

$$T_{proc\text{-}nru,2} = \max((N_2+d_{2,1}+C)(2048+144) \cdot \kappa 2^{-\mu} \cdot T_C, d_{2,2}), \text{ or}$$

$$T_{proc\text{-}nru,2} = \max((N_2+d_{2,1}+C)(2048+144) \cdot \kappa 2^{-\mu} \cdot T_C - \text{ceil}(\Delta/(\kappa 2^{-\mu} \cdot T_C)) \cdot \kappa 2^{-\mu} \cdot T_C, d_{2,2})$$

In some embodiments, the uplink channel may be a second PUSCH carrying CSI. Reporting of the CSI is triggered by a second PDCCH. The third processing unit 501 may be configured to: determine that the uplink channel includes the valid CSI when a time length between an end position of the last symbol of the second PDCCH transmitted by the network device and the first start position of the CP of the first symbol in the uplink channel is greater than third processing time, or the time length between the end position of the last symbol of the first PDCCH transmitted by the network device and the second start position of the ECP of the first symbol in the uplink channel is greater than the third processing time; or otherwise determine that the uplink channel does not include valid CSI.

In some embodiments, the third processing time may be determined depending on the start position of the uplink channel and/or the processing capability of the terminal device, and the third processing time may include:

$$T_{proc,CSI} = (Z)(2048+144) \cdot \kappa 2^{-\mu} \cdot T_C, \text{ or}$$

$$T_{proc\text{-}nru,CSI} = (Z+C)(2048+144) \cdot \kappa 2^{-\mu} \cdot T_C, \text{ or}$$

$$T_{proc\text{-}nru,CSI} = (Z+C)(2048+144) \cdot \kappa 2^{-\mu} \cdot T_C - \text{ceil}(\Delta/(\kappa 2^{-\mu} \cdot T_C)) \cdot \kappa 2^{-\mu} \cdot T_C.$$

In some embodiments, the CSI report may be the n-th CSI report. The third processing unit may be configured to: determine the uplink channel includes the valid CSI corresponding to the n-th CSI report when a time length between an end position of a reference symbol transmitted by the network device and the first start position of the CP of the first symbol in the uplink channel is greater than fourth processing time, or a time length between the end position of the reference symbol transmitted by the network device and the second start position of the ECP of the first symbol in the uplink channel is greater than the fourth processing time; or otherwise determine that the uplink channel includes the valid CSI corresponding to the (n−1)-th CSI report.

The reference symbol may be the last symbol of an aperiodic CSI-RS resource for channel measurement, an aperiodic CSI-IM resource for interference measurement, or an aperiodic NZP CSI-RS resource for interference measurement, corresponding to the n-th CSI report, whichever occurs last.

In some embodiments, the fourth processing time may be determined depending on the start position of the uplink channel and/or the processing capability of the terminal device, and the fourth processing time may include:

$$T'_{proc,CSI} = (Z')(2048+144) \cdot \kappa 2^{-\mu} \cdot T_C, \text{ or}$$

$$T'_{proc\text{-}nru,CSI} = (Z'+C)(2048+144) \cdot \kappa 2^{-\mu} \cdot T_C, \text{ or}$$

$$T'_{proc\text{-}nru,CSI} = (Z'+C)(2048+144) \cdot \kappa 2^{-\mu} \cdot T_C - \text{ceil}(\Delta/(\kappa 2^{-\mu} \cdot T_C)) \cdot \kappa 2^{-\mu} \cdot T_C.$$

In the above embodiments of the present disclosure, d2,1=0 or 1, $T_C = 1/(\Delta f_{max} \cdot N_f)$, $\Delta f_{max} = 480 \cdot 10^3$ Hz, $N_f = 4096$ and μ is used to determine a subcarrier spacing.

An embodiment of the present disclosure further provides a terminal device. The terminal device includes a processor and a memory for storing a computer program executable on the processor. The processor is configured to, when executing the computer program, perform the steps of the above uplink transmission method performed by the terminal device.

An embodiment of the present disclosure further provides a network device. The network device includes a processor and a memory for storing a computer program executable on the processor. The processor is configured to, when executing the computer program, perform the steps of the above uplink transmission method performed by the network device.

An embodiment of the present disclosure further provides a chip. The chip includes a processor configured to invoke and execute a computer program from a memory, to enable a device provided with the chip to perform the above uplink transmission method performed by the terminal device.

An embodiment of the present disclosure further provides a chip. The chip includes a processor configured to invoke and execute a computer program from a memory, to enable a device provided with the chip to perform the above uplink transmission method performed by the network device.

An embodiment of the present disclosure further provides a storage medium. The storage medium stores an executable program which, when executed by a processor, implements the above uplink transmission method performed by the terminal device.

An embodiment of the present disclosure further provides a storage medium. The storage medium stores an executable program which, when executed by a processor, implements the above uplink transmission method performed by the network device.

An embodiment of the present disclosure further provides a computer program product. The computer program product includes computer program instructions that cause a computer to perform the above uplink transmission method performed by the terminal device.

An embodiment of the present disclosure further provides a computer program product. The computer program product includes computer program instructions that cause a computer to perform the above uplink transmission method performed by the network device.

An embodiment of the present disclosure further provides a computer program. The computer program causes a computer to perform the above uplink transmission method performed by the terminal device.

An embodiment of the present disclosure further provides a computer program. The computer program causes a computer to perform the above uplink transmission method performed by the network device.

Figure 11:
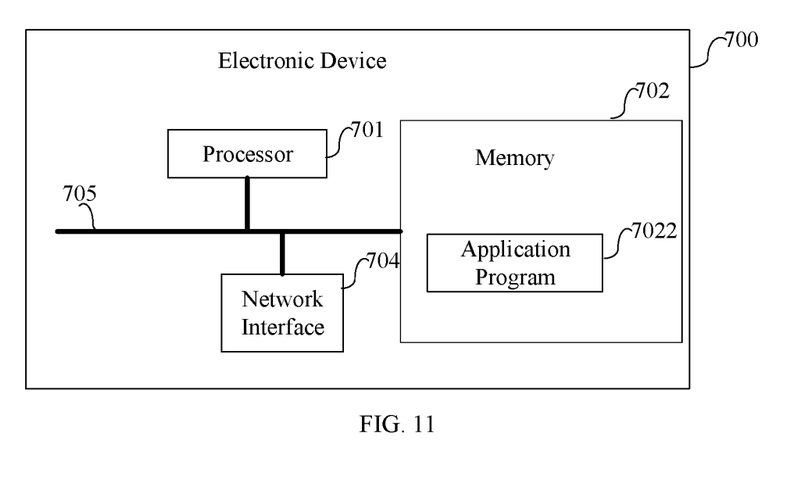
FIG. 11 is a schematic diagram showing a hardware structure of an electronic device according to an embodiment of the present disclosure.

FIG. 11 is a schematic diagram showing a hardware structure of an electronic device (terminal device or network device) according to an embodiment of the present disclosure. The electronic device 700 includes: at least one processor 701, a memory 702, and at least one network interface 704. The components in the electronic device 700 are coupled together via a bus system 705. It can be appreciated that the bus system 705 is configured to implement connection and communication between these components. In addition to a data bus, the bus system 705 also includes a power bus, a control bus, and a status signal bus. However, for the purpose of description, these buses are denoted as the bus system 705 in FIG. 11.

It can be appreciated that the memory 702 may be a transitory memory or a non-transitory memory, and may also include both transitory and non-transitory memories. Here, the non-transitory memory can be a ROM, a Programmable Read-Only Memory (PROM), an Erasable Programmable Read-Only Memory (EPROM), an Electrically Erasable Programmable Read-Only Memory (EEPROM), a Ferromagnetic Random Access Memory (FRAM), a flash memory, a magnetic surface memory (e.g., magnetic disk storage or magnetic tape storage), an optical disc, or a Compact Disc Read-Only Memory (CD-ROM). The transitory memory may be a Random Access Memory (RAM), which can be used as an external cache. As non-limiting examples, various forms of RAMs are available, such as Static Random Access Memory (SRAM), Synchronous Static Random Access Memory (SSRAM), Dynamic Random Access Memory (DRAM), Synchronous Dynamic Random Access Memory (SDRAM), Double Data Rate Synchronous Dynamic Random Access Memory (DDRSDRAM), Enhanced Synchronous Dynamic Random Access Memory (ESDRAM), SyncLink Dynamic Random Access Memory (SLDRAM), or Direct Rambus Random Access Memory (DRRAM). The memory 702 described in the embodiment of the present disclosure is intended to include, but not limited to, any of these and any other suitable types of memories.

The memory 702 in the embodiment of the present disclosure is configured to store various types of data to support the operation of the electronic device 700. Examples of such data include: any computer program operable on the electronic device 700, such as an application program 7022. The program for implementing the method of the embodiment of the present disclosure may be included in the application program 7022.

The method disclosed in any of the embodiments of the present disclosure may be applied to the processor 701 or implemented by the processor 701. The processor 701 may be an integrated circuit chip with signal processing capabilities. In the implementation process, the steps of any of the above methods can be performed by a hardware integrated logic circuit in the processor 701 or instructions in the form of software. The above processor 701 may be a general-purpose processor, a Digital Signal Processor (DSP), or any other programmable logic device, discrete gate or transistor logic device, discrete hardware component, or the like. The processor 701 may implement or execute the methods, steps, and logical block diagrams disclosed in the embodiments of the present disclosure. The general-purpose processor may be a microprocessor or any conventional processor or the like. The steps of the method disclosed in any of the embodiments of the present disclosure may be directly embodied as being executed and completed by a hardware decoding processor, or by a combination of hardware and software modules in the decoding processor. The software modules may be located in a storage medium, which may be provided in the memory 702. The processor 701 reads information from the memory 702 and performs the steps of any of the methods in combination with its hardware.

In an exemplary embodiment, the electronic device 700 may be implemented by one or more Application Specific Integrated Circuits (ASICs), DSPs, Programmable Logic Devices (PLDs), Complex Programmable Logic Devices (CPLDs), FPGAs, general-purpose processors, controllers, MCUs, MPUs, or other electronic components to implement any of the methods.

The present disclosure has been described with reference to flowcharts and/or block diagrams of methods, devices (systems), and computer program products according to embodiments of the present disclosure. It can be appreciated that each process and/or block in the flowcharts and/or block diagrams, and the combination of processes and/or blocks in the flowcharts and/or block diagrams, can be implemented by computer program instructions. These computer program instructions can be provided to a processor of a general-purpose computer, a special-purpose computer, an embedded processor, or any other programmable data processing device to generate a machine, such that instructions executed by the processor of the computer or any other programmable data processing device can generate means for implementing the functions specified in one or more processes in the flowcharts and/or one or more blocks in the block diagrams.

These computer program instructions can also be stored in a computer-readable memory that can direct a computer or any other programmable data processing device to operate in such a manner that instructions stored in the computer-readable memory can generate an article of manufacture including instruction means for implementing the functions specified in one or more processes in the flowcharts and/or one or more blocks in the block diagrams.

These computer program instructions can also be loaded on a computer or any other programmable data processing device, such that a sequence of operation steps can be executed on the computer or any other programmable device to generate computer-implemented processes, so as to perform the steps for implementing the functions specified in one or more processes in the flowcharts and/or one or more blocks in the block diagrams on the computer or any other programmable device.

While the preferred embodiments of the present disclosure have been described above, they are not intended to limit the scope of the present disclosure. Any modifications, equivalents and improvements that are made without departing from the spirit and principle of the present disclosure are to be encompassed by the scope of the present disclosure.

What is claimed is:

1. An uplink transmission method, comprising:
   determining, by a terminal device, a start position of an uplink channel; and
   determining, by the terminal device, a transmission of the uplink channel based on whether a processing delay is satisfied,
   wherein whether the processing delay is satisfied is dependent on the start position of the uplink channel and/or a processing capability of the terminal device,
   wherein the uplink channel is an uplink channel carrying first Hybrid Automatic Repeat reQuest-Acknowledgement (HARQ-ACK) information corresponding to a first Physical Downlink Shared Channel (PDSCH), and the processing delay being satisfied comprises: a time length between an end position of the last symbol of the first PDSCH received by the terminal device and the first start position of a Cyclic Prefix (CP) of the first symbol in the uplink channel being greater than a first processing time, wherein the first processing time is determined depending on the start position of the uplink channel and/or the processing capability of the terminal device, and the first processing time comprises:

$$T_{proc\text{-}nru,1}=(N_1+d_{1,1}+C)(2048+144)\cdot\kappa 2^{-\mu}\cdot T_C\text{-}\mathrm{ceil}(\Delta/(\kappa 2^{-\mu}\cdot T_C))\cdot\kappa 2^{-\mu}\cdot T_C,$$

where $T_C=1/(\Delta f_{max}\cdot N_f)$, $\Delta f_{max}=480\cdot 10^3$ Hz, $N_f=4096$, and $\mu$ is used to determine a subcarrier spacing; or wherein the uplink channel is a first Physical Uplink Shared Channel (PUSCH) carrying a target transport block and/or a Demodulation Reference Signal (DMRS), the first PUSCH being scheduled by a first PDCCH, and the processing delay being satisfied comprises: a time length between an end position of the last symbol of the first PDCCH received by the terminal device and the first start position of the CP of the first symbol in the uplink channel being greater than a second processing time, wherein the second processing time is determined depending on the start position of the uplink channel and/or the processing capability of the terminal device, and the second processing time comprises:

$$T_{proc\text{-}nru,2}=\max(N_2+d_{2,1}+C)(2048+144)\cdot K2^{-\mu}\cdot T_c\text{-}\mathrm{ceil}(\Delta/(K2^{-\mu}\cdot T_c)\cdot K2^{-\mu}\cdot T_c,d_{2,2})$$

where $T_c=1/(\Delta f_{max}\cdot N_f)$, $\Delta f_{max}=480\cdot 10^3$ Hz, $N_f=4096$ and $\mu$ is used to determine a subcarrier spacing.

2. The method according to claim 1, wherein the start position of the uplink channel comprises a first start position of the CP of the first symbol in the uplink channel.

3. The method according to claim 1, wherein in a case that the uplink channel is the uplink channel carrying the first HARQ-ACK information corresponding to the first PDSCH, said determining, by the terminal device, the transmission of the uplink channel based on whether the processing delay is satisfied comprises:
   determining, by the terminal device, that the uplink channel includes the valid first HARQ-ACK information when the processing delay is satisfied, or
   determining, by the terminal device, that the uplink channel does not include the valid first HARQ-ACK information when the processing delay is not satisfied.

4. The method according to claim 1, wherein in a case that the uplink channel is the first PUSCH carrying the target transport block and/or the DMRS, said determining, by the terminal device, the transmission of the uplink channel based on whether the processing delay is satisfied comprises:
   determining, by the terminal device, to transmit the uplink channel when the processing delay is satisfied, or refraining, by the terminal device, from transmitting the uplink channel when the processing delay is not satisfied.

5. A terminal device, comprising a processor and a memory for storing a computer program executable on the processor, wherein the processor is configured to, when executing the computer program:
   determine a start position of an uplink channel; and
   determine a transmission of the uplink channel based on whether a processing delay is satisfied,
   wherein whether the processing delay is satisfied is dependent on the start position of the uplink channel and/or a processing capability of the terminal device,
   wherein the uplink channel is an uplink channel carrying first Hybrid Automatic Repeat reQuest-Acknowledgement (HARQ-ACK) information corresponding to a first Physical Downlink Shared Channel (PDSCH), and the processing delay being satisfied comprises: a time length between an end position of the last symbol of the first PDSCH received by the terminal device and the first start position of a Cyclic Prefix (CP) of the first symbol in the uplink channel being greater than a first processing time, wherein the first processing time is determined depending on the start position of the uplink channel and/or the processing capability of the terminal device, and the first processing time comprises:

$$T_{proc-nru,1} = (N_1 + d_{1,1} + C)(2048+144) \cdot K2^{-\mu} \cdot T_c - \text{ceil}(\Delta/(K2^{-\mu} \cdot T_c)) \cdot K2^{-\mu} \cdot T_c,$$

where $T_c = 1/(\Delta f_{max} \cdot N_f)$, $\Delta f_{max} = 480 \cdot 10^3$ Hz, $N_f = 4096$ and $\mu$ is used to determine a subcarrier spacing; or
   wherein the uplink channel is a first Physical Uplink Shared Channel (PUSCH) carrying a target transport block and/or a Demodulation Reference Signal (DMRS), the first PUSCH being scheduled by a first PDCCH, and the processing delay being satisfied comprises: a time length between an end position of the last symbol of the first PDCCH received by the terminal device and the first start position of the CP of the first symbol in the uplink channel being greater than a second processing time, wherein the second processing time is determined dependent on the start position of the uplink channel and/or the processing capability of the terminal device, and the second processing time comprises:

$$T_{proc-nru,2} = \max((N_2 + d_{2,1} + C)(2048+144) \cdot K2^{-\mu} \cdot T_c - \text{ceil}(\Delta/(K2^{-\mu} \cdot T_c)) \cdot K2^{-\mu} \cdot T_c, d_{2,2})$$

where $T_c = 1/(\Delta f_{max} \cdot N_f)$, $\Delta f_{max} = 480 \cdot 10^3$ Hz, $N_f = 4096$ and $\mu$ is used to determine a subcarrier spacing.

6. The terminal device according to claim 5, wherein the start position of the uplink channel comprises a first start position of the CP of the first symbol in the uplink channel.

7. The terminal device according to claim 5, wherein in a case that the uplink channel is the uplink channel carrying the first HARQ-ACK information corresponding to the first PDSCH, the processor is further configured to, when executing the computer program:
   determine that the uplink channel includes the valid first HARQ-ACK information when the processing delay is satisfied, or
   determine that the uplink channel does not include the valid first HARQ-ACK information when the processing delay is not satisfied.

8. The terminal device according to claim 5, wherein in a case that the uplink channel is the first PUSCH carrying the target transport block and/or the DMRS, the processor is further configured to, when executing the computer program:
   determine to transmit the uplink channel by the terminal device when the processing delay is satisfied, or
   refrain from transmitting the uplink channel by the terminal device when the processing delay is not satisfied.

9. A network device, comprising a processor and a memory for storing a computer program executable on the processor, wherein the processor is configured to, when executing the computer program:
   determine whether an uplink channel received by the network device comprises valid data based on a start position of the uplink channel transmitted by a terminal device and/or a processing capability of the terminal device,
   wherein the uplink channel is an uplink channel carrying first Hybrid Automatic Repeat reQuest-Acknowledgement (HARQ-ACK) information corresponding to a first Physical Downlink Shared Channel (PDSCH), and wherein the processor is further configured to, when executing the computer program: determine that the uplink channel comprises the valid first HARQ-ACK information when a time length between an end position of the last symbol of the first PDSCH transmitted by the network device and the first start position of a Cyclic Prefix (CP) of the first symbol in the uplink channel is longer than the a first processing time, or otherwise determine that the uplink channel does not comprise the valid first HARQ-ACK information, wherein the first processing time is determined depending on the start position of the uplink channel and/or the processing capability of the terminal device, and the first processing time comprises:

$$T_{proc-nru,1} = (N_1 + d_{1,1} + C)(2048+144) \cdot K2^{-\mu} \cdot T_c - \text{ceil}(\Delta/(K2^{-\mu} \cdot T_c)) \cdot K2^{-\mu} \cdot T_c,$$

where $T_c = 1/(\Delta f_{max} \cdot N_f)$, $\Delta f_{max} = 480 \cdot 10^3$ Hz, $N_f = 4096$ and $\mu$ is used to determine a subcarrier spacing; or
   wherein the uplink channel is a first Physical Uplink Shared Channel (PUSCH) carrying a target transport block and/or a Demodulation Reference Signal (DMRS), the first PUSCH being scheduled by a first PDCCH, and wherein the processor is further configured to, when executing the computer program: determine that the uplink channel comprises the valid data when a time length between an end position of the last symbol of the first PDCCH transmitted by the network device and the first start position of the CP of the first symbol in the uplink channel is greater than a second processing time, wherein the second processing time is determined depending on the start position of the uplink channel and/or the processing capability of the terminal device, and the second processing time comprises:

$$T_{proc-nru,2} = \max((N_2 + d_{2,1} + C)(2048+144) \cdot K2^{-\mu} T_c - \text{ceil}(\Delta/(K2^{-\mu} \cdot T_c)) \cdot K2^{-\mu} \cdot T_c, d_{2,2})$$

where $T_c = 1/(\Delta f_{max} \cdot N_f)$, $\Delta f_{max} = 480 \cdot 10^3$ Hz, $N=4096$ and $\mu$ is used to determine a subcarrier spacing.

10. The network device according to claim 9, wherein the start position of the uplink channel comprises a first start position of the CP of the first symbol in the uplink channel.

* * * * *